US009509997B2

(12) United States Patent
Fujino et al.

(10) Patent No.: US 9,509,997 B2
(45) Date of Patent: Nov. 29, 2016

(54) IMAGING APPARATUS, IMAGING METHOD AND STORAGE MEDIUM, IMAGE CODING APPARATUS, IMAGE CODING METHOD AND STORAGE MEDIUM

(71) Applicant: CANON KABUSHIKI KAISHA, Tokyo (JP)

(72) Inventors: Reiko Fujino, Kawasaki (JP); Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 13/915,396

(22) Filed: Jun. 11, 2013

(65) Prior Publication Data
US 2013/0335591 A1 Dec. 19, 2013

(30) Foreign Application Priority Data

Jun. 13, 2012 (JP) ................. 2012-133630

(51) Int. Cl.
*H04N 5/225* (2006.01)
*H04N 19/597* (2014.01)
*H04N 19/105* (2014.01)
*H04N 19/172* (2014.01)
*H04N 19/156* (2014.01)

(52) U.S. Cl.
CPC ...... *H04N 19/00769* (2013.01); *H04N 19/105* (2014.11); *H04N 19/172* (2014.11); *H04N 19/597* (2014.11); *H04N 19/156* (2014.11)

(58) Field of Classification Search
USPC .......................................... 348/218.1, 222.1
See application file for complete search history.

(56) References Cited

U.S. PATENT DOCUMENTS

| 6,757,441 B1* | 6/2004 | Katayama et al. ........... 382/248 |
|---|---|---|
| 8,648,927 B2* | 2/2014 | Kitagawa et al. ......... 348/222.1 |
| 2007/0121722 A1* | 5/2007 | Martinian ............ H04N 19/597 375/240.12 |
| 2008/0259172 A1* | 10/2008 | Tamaru ...................... 348/218.1 |
| 2009/0028248 A1* | 1/2009 | Kitahara ............ H04N 13/0018 375/240.26 |
| 2010/0021072 A1* | 1/2010 | Shimizu ............... H04N 19/527 382/233 |
| 2010/0220784 A1* | 9/2010 | Tanimoto et al. ....... 375/240.12 |
| 2011/0013848 A1* | 1/2011 | Hasegawa ..................... 382/232 |
| 2012/0121012 A1* | 5/2012 | Shiodera .......... H04N 19/00121 375/240.03 |
| 2013/0258139 A1* | 10/2013 | Omori ................ H04N 13/0007 348/239 |

FOREIGN PATENT DOCUMENTS

| JP | H09-261653 A | 10/1997 |
|---|---|---|
| JP | 2006-115336 A | 4/2006 |
| JP | 2008-252682 A | 10/2008 |
| WO | 2012/042895 A1 | 4/2012 |

* cited by examiner

*Primary Examiner* — Sinh Tran
*Assistant Examiner* — Zhenzhen Wu
(74) *Attorney, Agent, or Firm* — Canon USA, Inc. I.P. Division

(57) ABSTRACT

A multi-viewpoint image which has been captured with respect to an object from a plurality of viewpoints is coded by setting a base viewpoint among the plurality of viewpoints. An image captured from a viewpoint that is not the base viewpoint is then coded using a reference image selected based on imaging parameters and a parallax.

13 Claims, 8 Drawing Sheets

IMAGING APPARATUS, IMAGING METHOD AND STORAGE MEDIUM, IMAGE CODING APPARATUS, IMAGE CODING METHOD AND STORAGE MEDIUM

BACKGROUND OF THE INVENTION

Field of the Invention

The present invention relates to an imaging apparatus and an image coding apparatus for coding an image captured from a plurality of viewpoints.

Description of the Related Art

Conventionally, there is a method for generating an image at an arbitrary focal length, depth of field, and a viewpoint, using a multi-viewpoint image capturing an object from a plurality of viewpoints. Encoding (hereinafter coding) is then performed on the captured multi-viewpoint image, so that a data amount can be reduced. Such coded data can be recorded in a storage medium, or transferred to a server via a network.

Japanese Patent Application Laid-Open No. 9-0261653 discusses using inter-viewpoint prediction coding (hereinafter referred to as inter-viewpoint prediction) for coding the captured multi-viewpoint image. If the captured multi-viewpoint images are close to each other, there is correlation between each of the images. The inter-viewpoint prediction thus uses such correlation between the images. Japanese Patent Application Laid-Open No. 9-0261653 discusses capturing an object from a plurality of viewpoints employing a plurality of cameras, and acquiring the multi-viewpoint image. One of the viewpoints among the plurality of viewpoints is then set as a base viewpoint.

When coding the image captured from the viewpoint set as the base viewpoint, an image captured in the past from a viewpoint which is identical to the base viewpoint (hereinafter referred to as an identical viewpoint image) is used as a reference image. On the other hand, if the image acquired by capturing from a viewpoint other than the base viewpoint is to be coded, the identical viewpoint image and an image captured from an adjacent viewpoint that is nearer to the base viewpoint (hereinafter referred to as an adjacent viewpoint image) are used as the reference images.

Japanese Patent Application Laid-Open No. 9-0261653 discusses performing the inter-viewpoint prediction employing the identical viewpoint image and the adjacent viewpoint image as candidates for the reference images. As a result, if imaging conditions are different, a prediction error in the inter-viewpoint prediction increases, and coding efficiency decreases even when the reference image is the identical viewpoint image or the adjacent image. Further, if an image in which there is underexposure or overexposure is used as the base viewpoint, the coding efficiency is similarly reduced.

SUMMARY OF THE INVENTION

The present invention is directed to providing an imaging apparatus and an image coding apparatus capable of efficiently performing coding employing inter-viewpoint prediction.

According to an aspect of the present invention, an imaging apparatus configured to code a multi-viewpoint image captured from a plurality of viewpoints with respect to an object includes an imaging unit configured to capture an image using parameters related to exposure set for each of the plurality of viewpoints, a selection unit configured to, based on the parameters related to the exposure set for each of the plurality of viewpoints, select a reference image of an image to be coded which is captured by the imaging unit, and a coding unit configured to code the image to be coded using the reference image selected by the selection unit.

According to another aspect of the present invention, an image coding apparatus configured to code a multi-viewpoint image captured from a plurality of viewpoints with respect to an object includes an input unit configured to input an image that has been captured using parameters related to exposure set for each of the plurality of viewpoints, a selection unit configured to, based on the parameters related to exposure set for each of the plurality of viewpoints, select a reference image of an image to be coded which is input by the input unit, and a coding unit configured to code the image using the reference image selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The first exemplary embodiment will be described below.

According to the present exemplary embodiment, the imaging apparatus includes a coding unit that codes the multi-viewpoint image in which the object is captured from a plurality of viewpoints. Further, according to the present exemplary embodiment, the images read from the image sensor included in the imaging apparatus such as a digital camera or a digital camcorder, and images received via a network, are coded. In addition, the present invention is not limited thereto. The coding unit may be included in another apparatus different from the imaging apparatus. In other words, according to the present exemplary embodiment, the imaging apparatus including a plurality of image sensors and an image coding apparatus which performs coding may be separated.

Figure 1:
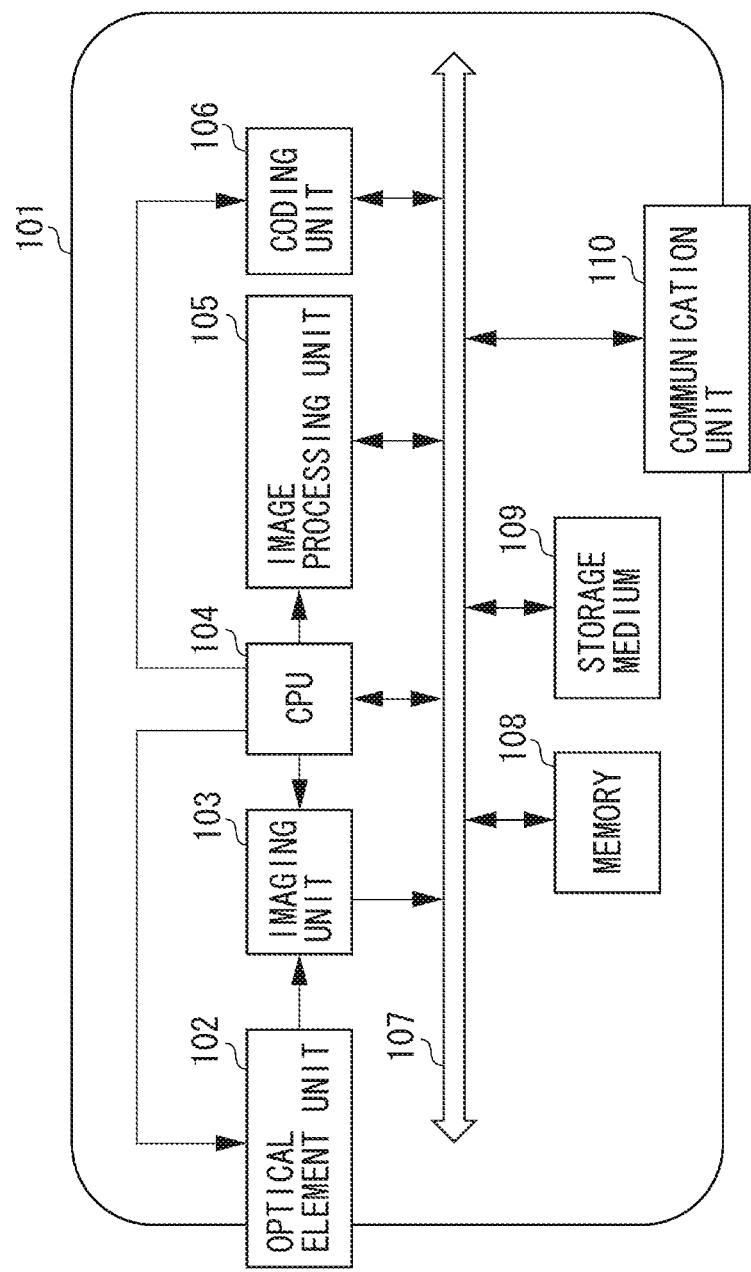
FIG. 1 illustrates a configuration of an imaging apparatus according to a first exemplary embodiment of the present invention.

FIG. 1 illustrates a multiple-lens imaging apparatus including a plurality of image sensors.

Referring to FIG. 1, an imaging apparatus 101 includes an optical element unit 102, an imaging unit 103, a central processing unit (CPU) 104, an image processing unit 105, a coding unit 106, a bus 107, a memory 108, a storage medium 109, and a communication unit 110.

Figure 2:
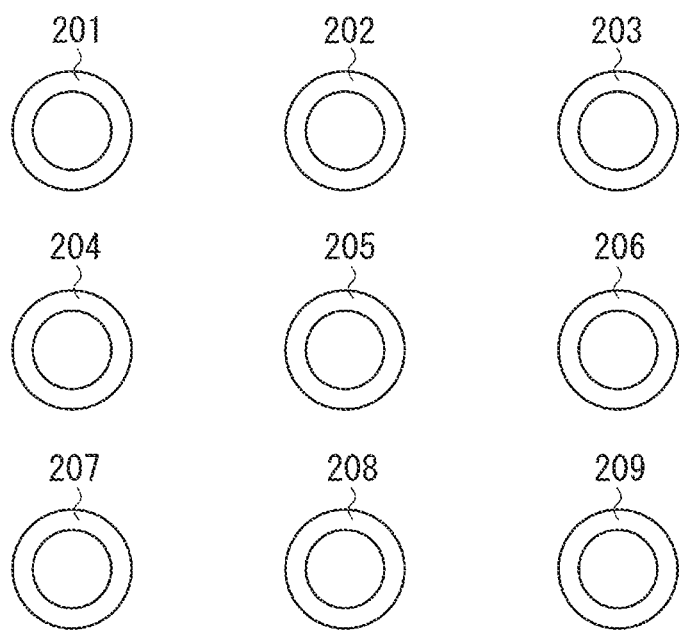
FIG. 2 illustrates an arrangement of image sensors configuring an optical element unit according to the first exemplary embodiment.

The optical element unit 102 performs control of an imaging system, such as focusing on the object, opening and closing a shutter, and adjusting an aperture value. The optical element unit 102 receives optical information of the object on a sensor (i.e., the image sensor), and transfers the received signal to the imaging unit 103. FIG. 2 illustrates a configuration example of the optical element unit 102. Referring to FIG. 2, the optical element unit 102 includes nine image sensors 201, 202, 203, 204, 205, 206, 207, 208, and 209 that are evenly-arranged on a square lattice. FIG. 2 illustrates the nine image sensors evenly-arranged on the square lattice as an example. However, according to the present invention, the number of image sensors and the arrangement thereof are not limited thereto.

The imaging unit 103 performs analog/digital (A/D) conversion on an optical signal (i.e., analog data) transferred from the optical element 102, and acquires a plurality of images (i.e., digital data).

The CPU 104 collectively controls each unit to be described below.

The image processing unit 105 performs various types of image processing, such as white balance processing, gamma processing, and noise reduction processing, on the image received from the imaging unit 103 via the bus 107.

The coding unit 106 codes the image.

The bus 107 is a transfer path of the various data. For example, the digital data acquired by the imaging unit 103 is transferred to predetermined processing units via the bus 107.

The memory 108 is a random access memory (RAM) and functions as a main memory and a work area of the CPU 104.

The storage medium 109 is a detachable storage medium that stores the image coded by the coding unit 106 (such image is hereinafter referred to as a coded image). The storage medium may be a hard disk, a memory card, a compact flash (CF) card, a secure digital (SD) card, or a universal serial bus (USB) memory.

The communication unit 110 transmits the coded image stored in the storage medium 109 to a computer, a printer, or a data storage server. Further, the communication unit 110 is a USB or wireless interface used when receiving the coded image or a program from an external device.

The method performed by the imaging apparatus 101 for coding the multi-viewpoint captured image and transferring the image to the server will be described below.

The CPU 104 transfers to the optical element unit 102 the parameters of the imaging conditions, such as an exposure time, a focus position, and the aperture value previously set by a user. Upon receiving a start instruction for imaging by the user operation or from the outside, the CPU 104 transmits a light receiving instruction to the optical element unit 102, and an image acquirement instruction to the imaging unit 103. The optical element unit 102 then performs control of the imaging system based on the received imaging condition parameters and the light receiving instruction. The imaging condition parameters are parameters related to exposure or the focus position, and hereinafter to be referred to as imaging parameters.

Further, the exposure time is the period of time the image sensor is exposed to light passing through the lens when the imaging apparatus captures an image. Exposure thus indicates that the image sensor is exposed to the light passing through the lens. Furthermore, exposure may also indicate the total amount of light passing through the lens (i.e., an amount of exposure), or brightness of the captured image. In general, the image sensor is exposed by opening and closing of the shutter. Moreover, exposure is determined by a combination of the exposure time, the aperture value of the lens, and sensitivity of the sensor. The amount of exposure increases along with the exposure time or the aperture value of the lens, or along with a decrease in the sensitivity of the sensor.

The exposure time may be expressed by shutter speed. The shutter speed increases as the exposure time decreases, and decreases as the exposure time increases. The shutter speed is thus one of the elements that determine the exposure.

The optical element unit 102 receives at a designated frame rate, the optical information of the object using the image sensors 201, 202, 203, 204, 205, 206, 207, 208, and 209. The optical element unit 102 then transfers the received signal to the imaging unit 103.

The imaging unit 103 performs A/D conversion on the received signals corresponding to a plurality of images, and transmits the acquired image to the memory 108 via the bus 107.

The above-described series of imaging processing performed by the CPU 104, the optical element unit 102, the imaging unit 103, and the image sensors 201 through 209 is continued until the imaging apparatus 101 receives from the CPU 104 an instruction to end image capturing. For example, if the optical element unit 102 includes the nine image sensors 201 through 209 as illustrated in FIG. 2, the optical element unit 102 sets the imaging parameters to each of the image sensors 201 through 209. Upon respectively receiving the optical information from the object, the image sensors 201 through 209 in the optical element unit 102 transmit the received optical signals of 9 viewpoints to the imaging unit 103. Further, each of the image sensors 201 through 209 continues to receive the optical information at the designated frame rate, and continues to transmit the received signal to the imaging unit 103. Such a multiple-lens imaging apparatus thus acquires a color image group in which the same object is captured from a plurality of viewpoint positions.

Upon confirming light reception of the optical element 102 and completion of image transmission to the imaging unit 103, the CPU 104 transmits to the image processing unit 105 an instruction to start image processing.

Upon receiving the instruction from the CPU 104 to start image processing, the image processing unit 105 reads via the bus 107 the image stored in the memory 108. The image processing unit 105 then performs various types of image processing such as developing processing, white balance processing, gamma processing, and noise reduction processing. The image on which the image processing unit 105 has performed image processing is transmitted to and stored in the memory 108 via the bus 107 again.

Further, the CPU 104 transmits to the coding unit 106 an instruction to start coding. Upon receiving from the CPU 104 the instruction to start coding, the coding unit 106 reads from the memory 108 via the bus 107 the image on which image processing has been performed, and codes the image using a predetermined method. According to the present exemplary embodiment, the coding unit 106 in the image coding apparatus codes the input image from the plurality of the viewpoints using H.264 multi-viewpoint video coding (MVC) method. However, the present invention is not limited thereto. In other words, any coding method based on a differential coding method, represented by Motion Picture Experts Group (MPEG) method, may be used. The coding unit 106 will be described in detail below. The coding unit 106 then transmits the coded image to the storage medium 109 via the bus 107.

The storage medium 109 stores the coded image received from the coding unit 106.

Upon receiving an instruction to start communication, the communication unit 110 reads via the bus 107 the coded image stored in the storage medium 109, and transmits the read coded image to an external device such as a server connected to the imaging apparatus or a storage medium. According to the present exemplary embodiment, the communication unit 110 reads from the storage medium 109 and transmits the coded image. However, the present invention is not limited thereto. For example, the coding unit 106 may store in the memory 108 the coded image, and the communication unit 110 may read from the memory 108 and transmit the coded image.

The server (not illustrated) which receives the coded image decodes the received coded image and reconfigures the image. The plurality of images that have been reconfigured are captured from different viewpoints and based on different lengths of exposure time. As a result, the server adjusts the gradation and the position of a target portion in each of the decoded images, and performs high dynamic range (HDR) imaging. In HDR imaging, the plurality of images acquired by changing the exposure is combined at an arbitrary ratio. Tone mapping is then performed on the combined image, so that a dynamic range of the processed image is reduced, and an HDR image in which there is little overexposure and underexposure is generated. Tone mapping is performed by changing the contrast of the entire image, or by locally changing the contrast of the image. According to the present exemplary embodiment, the HDR imaging is performed on the reconfigured image acquired by decoding the coded image. However, the present invention is not limited to processing method of the reconfigured image.

According to the present exemplary embodiment, the imaging apparatus 101 may also include other elements in addition to the above-described elements.

The configuration of the coding unit 106 will be described in detail below with reference to FIG. 3.

Figure 3:
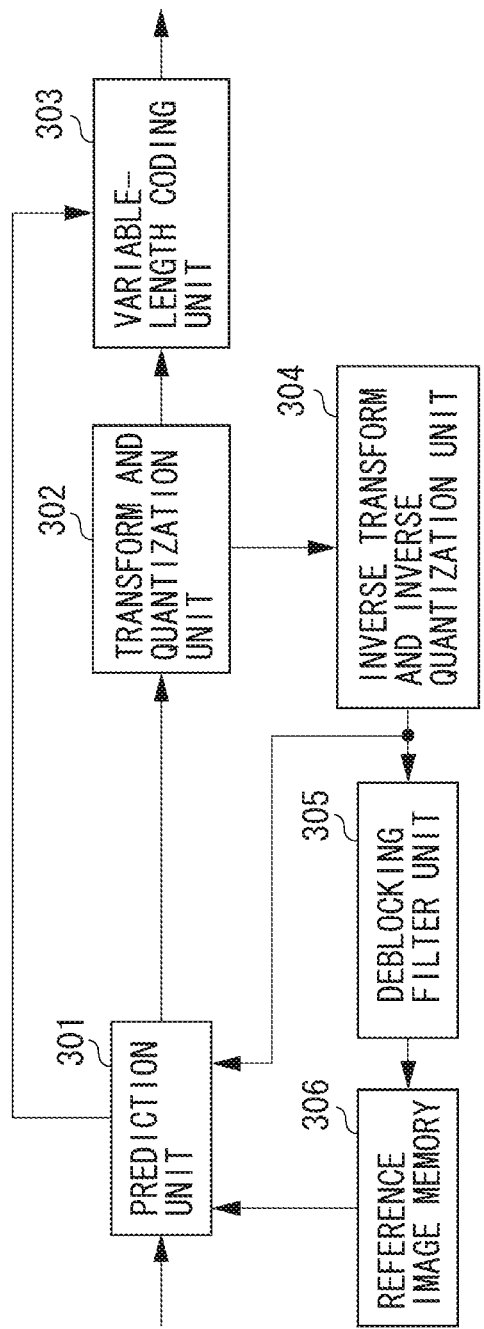
FIG. 3 illustrates a coding unit according to the first exemplary embodiment.

Referring to FIG. 3, the coding unit 106 includes a prediction unit 301, a transform and quantization unit 302, a variable-length coding unit 303, an inverse transform and inverse quantization unit 304, a deblocking filter unit 305, and a reference image memory 306.

The prediction unit 301 performs prediction coding on the input image. The prediction unit 301 will be described in detail below.

The transform and quantization unit 302 performs orthogonal transform and quantization on the image on which the prediction unit 301 has performed prediction coding.

The variable-length coding unit 303 performs variable-length coding on a transform coefficient of the image quantized by the transform and quantization unit 302, and outputs a bit stream. The variable-length coding unit 303 performs variable-length coding on various coding parameters including a motion vector or a parallax vector output from the prediction unit 301. Further, the variable-length coding unit 303 outputs and transmits to the storage medium 109 via the bus 107 the bit stream on which variable-length coding has been performed.

The inverse transform and inverse quantization unit 304 performs inverse quantization on the transform coefficient of the image quantized by the transform and quantization unit 302, and performs inverse transform.

The deblocking filter unit 305 performs block distortion removal on the inverse-transformed image processed by the inverse transform and inverse quantization unit 304.

Since the image output from the deblocking filter unit 305 may be used as the reference image when performing prediction coding of subsequent images, the reference image memory 306 stores the image output from the deblocking filter unit 305. According to the present exemplary embodiment, the reference image memory 306 is included as a dedicated memory in the coding unit 106. However, it is not limited thereto. For example, a frame memory area may be allocated on the memory 108.

The configuration of the prediction unit 301 will be described in detail below with reference to FIG. 4.

Figure 4:
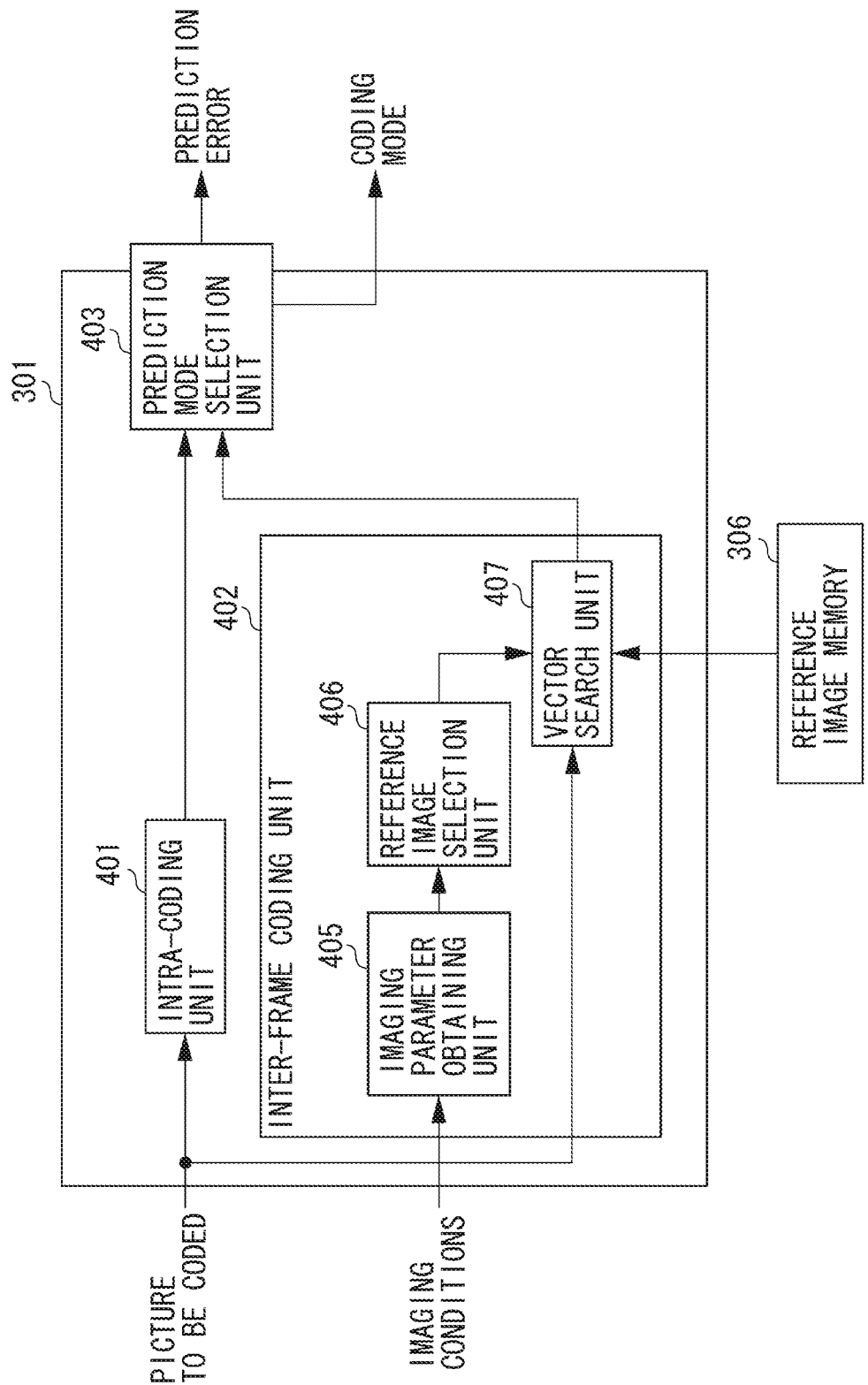
FIG. 4 illustrates a configuration of a prediction unit according to the first exemplary embodiment.

Referring to FIG. 4, the prediction unit 301 includes an intra-coding unit 401, an inter-frame coding unit 402, and a prediction mode selection unit 403. According to the present exemplary embodiment, the image is input one by one from the memory 108 to the intra-coding unit 401 and the inter-frame coding unit 402.

The intra-coding unit 401 performs using pixel signals in the image output from the memory 108, intra-prediction coding (hereinafter referred to as intra-prediction) on the image, and outputs a prediction error.

On the other hand, the inter-frame coding unit 402 performs using the reference image stored in the reference image memory 306, inter-frame prediction coding (hereinafter referred to as inter-frame prediction) on the image input from the memory 108. The inter-frame prediction includes coding using the identical viewpoint image as the reference image (hereinafter referred to as identical viewpoint prediction), and inter-viewpoint prediction using as the reference image, an image such as the adjacent viewpoint image captured from a different viewpoint. The inter-frame coding unit 402 thus performs the identical viewpoint prediction or the inter-viewpoint prediction with respect to the input image. The inter-frame coding unit 402 then outputs the motion vector or the parallax vector and the prediction error.

The prediction mode selection unit 403 selects either the image on which the intra-coding unit 401 has performed intra-prediction or the image on which the inter-frame coding unit 402 has performed the inter-frame prediction. The prediction mode selection unit 403 then outputs the prediction error and a prediction mode of the selected image. If execution of either the intra-prediction or the inter-frame prediction with respect to the input image is previously set, it is not necessary to perform the selection process.

The inter-frame coding unit 402 includes an imaging parameter acquiring unit 405, a reference image selection unit 406, and a vector search unit 407.

The imaging parameter acquiring unit 405 acquires from the memory 108, the exposure time, the focus position, and the aperture value with respect to each of the image sensors 201 through 209. The imaging parameter acquisition unit 405 then stores the imaging parameters associated with the position information of each of the image sensors 201 through 209. The imaging parameter acquiring unit 405 outputs, when performing inter-viewpoint prediction, the imaging parameters acquired from the memory 108 to the reference image selection unit 406.

The reference image selection unit 406 selects, using the imaging parameters received from the imaging parameter acquiring unit 405, the image to be added to a reference image list. The reference image list is an image group to be used as the reference images when performing vector search with respect to the image to be coded. The reference image selection unit 406 then transmits the generated reference image list to the vector search unit 407.

The vector search unit 407 reads from the reference image memory 306 the reconfigured image to be a candidate for the reference image (hereinafter referred to as a reference image candidate), based on the reference image list received from the reference image selection unit 406. The vector search unit 407 then performs vector search using the input image to be coded and the reference image candidate, and selects the reference image to be used in inter-frame prediction. As a result, the vector search unit 407 outputs to the prediction mode selection unit 403 the parallax vector or the motion vector and the prediction error.

According to the present exemplary embodiment, the imaging parameter acquisition unit 407 stores the imaging parameters of each of the image sensors 201 through 209. However, the reference image selection unit 406 may store the imaging parameters for determining the reference image.

The method performed by the reference image selection unit 406 for selecting the image to be added to the reference image list using the imaging parameters of the image sensor that has captured the image to be coded will be described below with reference to the flowchart illustrated in FIG. 5. According to the flowchart illustrated in FIG. 5, the image whose imaging parameters are close to those of the image sensor that has captured the image to be coded, and which is captured by the image sensor whose parallax with respect to the image sensor that has captured the image to be coded is small is selected. According to the present exemplary embodiment, the image sensor 205 is the image sensor corresponding to the base viewpoint, and the image sensor 202 captures the image to be coded. However, the present exemplary embodiment is not limited thereto.

In step S501, the reference image selection unit 406 determines whether the image to be coded is an image captured from the base viewpoint (i.e., a base viewpoint image). If the image to be coded is the base viewpoint image (YES in step S501), inter-viewpoint prediction is not to be performed, and the determination process ends. On the other hand, if the image to be coded is not the base viewpoint image (NO in step S501), the process proceeds to step S502. According to the present exemplary embodiment, the base viewpoint is the image sensor 205, so that the image captured by the image sensor 202 is not the base viewpoint image. The process thus proceeds to step S502.

In step S502, the reference image selection unit 406 acquires from the imaging parameter acquiring unit 405 the imaging parameters of the image sensor 202 that has captured the image to be coded. The imaging parameters are the parameters used when capturing the image, such as the exposure time, the focus position, the aperture value, the brightness of the lens (i.e., the F-number), and a sensitivity value of the sensor. In other words, the imaging parameters are the parameters related to the exposure or the focus position. The exposure can be adjusted using the parameters related to the exposure. According to the present invention, the image to be added to the reference image list is selected using the imaging parameters of each image sensor. However, it is only necessary to use at least one item among the above-described imaging parameters. According to the present exemplary embodiment, the imaging parameter is the exposure time for ease of description.

In step S503, the reference image selection unit 406 selects the image sensor 202 that has captured the image to be coded, and the image sensor which is within a range of a predetermined threshold value of the parallax. According to the present exemplary embodiment, the parallax is a parameter based on the distance between the image sensor that has captured the image to be coded and each image sensor. For example, the parallax may be distinguished as level 1, level 2, and level 3 in an increasing order of the distance between the image capturing. However, the present invention is not limited thereto, and the parallax may be the distance itself between the image sensors. Further, the parallax may be a difference in the viewpoint with respect to the object between the image sensors, expressed in terms of an angle. Further, according to the present exemplary embodiment, the CPU 104 sets to the reference image selection unit 406 in the coding unit 106 the parallax of each of the image sensors 201 through 209 previously set by the user or from an external interface. However, the present invention is not limited thereto, and the optical element unit 102 or the imaging unit 103 may be an output source of the parallax.

Further, in step S503, the reference image selection unit 406 acquires an identification (ID) of the extracted image sensor, and sets the image captured by the selected image sensor as the candidate for the image to be added to the reference image list (hereinafter referred to as a list candidate). Specifically, if the number of selected image sensors is N, the number of list candidates becomes N. The N list candidates are thus collectively set as the list candidate group. The process to be described below is thus performed in an appropriate order on each image in the list candidate group including N list candidates, and so that the reference image list is generated.

In step S504 to step S508, the reference image selection unit 406 selects as the reference image for performing prediction coding, the image satisfying predetermined exposure time condition and captured by the image sensor with the minimum parallax. The reference image is not limited to the reference image selected as described above, and may be appropriately selected from a combination of the exposure time and the parallax. For example, the image whose exposure time is identical or the closest may be selected as the reference image even if the parallax thereof does not satisfy the parallax threshold value. Such a selection is effective in the case where there are a small number of viewpoint images whose exposure is identical or the closest. In step S504, the reference image selection unit 406 acquires the exposure time and the parallax of the image sensor among N (N≥1) image sensors extracted in step S503, which performs nth imaging (1≤n≤N). The number of determination processes that has been performed (hereinafter the determination number) is indicated by n. Further, the exposure time of the nth image sensor will be referred to as an exposure time Tn, and the parallax with respect to the nth image sensor and the image sensor 202 that has captured the image to be coded will be referred to as a parallax Pn.

In step S505, the reference image selection unit 406 determines whether the acquired exposure time Tn is within the range of threshold values of the exposure time. The threshold values of the exposure time are predetermined. The threshold value of a lower limit on the exposure time will be referred to as a lower limit exposure time Th1, and the threshold value of an upper limit on the exposure time will be referred to as an upper limit exposure time Th2. It is necessary for the value of the upper limit exposure time Th2 to be greater than or equal to the value of the lower limit exposure time Th1. Further, the lower limit exposure time Th1 and the upper limit exposure time Th2 are the exposure time used in capturing the image to be coded, or time determined based on the exposure time. In step S505, the reference image selection unit 406 determines whether the exposure time Tn is within the range between the lower limit exposure time Th1 and the upper limit exposure time Th2, i.e., the threshold values of the exposure time. If the exposure time Tn is within the range between the threshold values (YES in step S505), the process proceeds to step S506. In step S506, the reference image selection unit 406 determines the parallax Pn. If the exposure time Tn is not within the range between the threshold values (NO in step S505), the image captured by the nth image sensor is not added to the reference image list. The process then proceeds to step S508. In step S508, the reference image selection unit 406 determines whether the image captured by the subsequent image sensor (n+1th image sensor) is to be added to the reference image list.

In step S506, the reference image selection unit 406 determines whether the parallax of the image sensor corresponding to each list candidate is smaller than the threshold value. More specifically, the reference image selection unit 406 compares the parallax Pn between the nth image sensor and the image sensor 202 that has captured the image to be coded, with a minimum parallax Pmin which is the threshold value of the parallax, and determines whether the parallax Pn is less than the minimum parallax Pmin. The minimum parallax Pmin when the determination number is 1 (n=1) is a parallax initial value Ph which is a threshold value predetermined as the initial value. If the parallax Pn is smaller than the minimum parallax Pmin (YES in step S506), the process proceeds to step S507. On the other hand, if the parallax Pn is greater than or equal to the minimum parallax Pmin (NO in step S506), the reference image selection unit 406 does not add the image captured by the nth image sensor to the reference image list. The process then proceeds to step S508. In step S508, the reference image selection unit 406 determines whether the image captured by the subsequent image sensor is to be added to the reference image list. In step S507, the reference image selection unit 406 stores the image captured by the nth image sensor in the reference image list, and rewrites the parallax Pn between the nth image sensor and the image sensor 202 that has captured the image to be coded as the minimum threshold value Pmin, i.e., the threshold value of the parallax.

In step S508, the reference image selection unit 406 determines whether to end selecting the images to be added to the reference image list. More specifically, if the determination number n is smaller than N (NO in step S508), the process proceeds to step S509, then returns to step S504, and repeats the determination process to generate the appropriate reference image list. If the determination number n is equivalent to N (YES in step S508), the reference image selection unit 406 determines that the selection of the reference image for coding of the image to be coded has been completed for all of the list candidate group, and ends the determination process.

In step S507, if the reference image list already stores the list candidate, the previously stored list candidate is discarded, and the list candidate of a smaller parallax is stored in the reference image list.

According to the present exemplary embodiment, the image which has been captured by the image sensor whose imaging parameters are close to those of the image sensor that has captured the image to be coded, and whose parallax with respect to the imaging sensor that has captured the image to be coded is small, is added to the reference list. Such a process is described with reference to the flowchart illustrated in FIG. 5. However, the present invention is not limited thereto. For example, if prediction coding is to be performed using a plurality of reference images that has been selected, the image whose parallax is the smallest regardless of the imaging parameters may be added to the reference image list along with the images selected according to the process of the flowchart illustrated in FIG. 5.

Further, according to the present exemplary embodiment, the exposure time is used as the imaging parameter. However, the present invention is not limited thereto. For example, a value C indicating the imaging parameter as in equation (1) may be calculated using an exposure time T, an aperture value I, a brightness of the lens F, and a sensitivity of the sensor S.

$$C = a1 \times T + a2 \times I + a3 \times F + a4 \times S \quad (1)$$

Where a1, a2, a3, and a4 in equation (1) are predetermined constants.

As a result, when performing inter-viewpoint prediction on the image group captured from a plurality of viewpoints by changing the exposure time for each image sensor, the reference image candidates can be narrowed down using the above-described configuration and operation, in particular the process performed by the reference image selection unit 406. A calculation amount of the parallax vector can thus be reduced.

According to the present exemplary embodiment, in step S503 of the process performed by the reference image selection unit 406, the image sensor within the predetermined threshold range of the parallax between the image sensor 202 that has captured the image to be coded is selected and set as the list candidate group. However, step S503 may be omitted according to the present invention. Specifically, the reference image list of all images at the same time excluding the image to be coded may be generated, instead of selecting the list candidate group. The process performed in step S503 is for omitting processing of the images captured by the image sensors which are far from the image sensor 202 that has captured the image to be coded. As a result, it becomes unnecessary to perform the processes of step S505 to step S509 on the images that are outside the threshold range of the parallax. In other words, the calculation amount can be reduced as compared to processing all images other than the image to be coded.

Further, according to the present exemplary embodiment, the list candidate group is selected from all image sensors, and the reference image list is further generated. However, the present invention is not limited thereto. More specifically, it is not always necessary to use the list candidate group or the reference image list, and the images that are not to be used as the reference image may instead be excluded from the ID list of all image sensors.

The specific method for selecting the image to be added to the reference image list will be described below.

Here, the optical element unit 102 includes six image sensors for example. Further, the values of the lower limit exposure time Th1 and upper limit exposure time Th2, i.e., the threshold values of the exposure time, are equal to the exposure time of the image sensor that has captured the image to be coded. Furthermore, the parallax initial value Ph, i.e., the initial parallax threshold value, is set to 5 (initial minimum parallax Pmin=parallax initial value Ph=5). The values of the lower limit exposure time Th1 and upper limit exposure time Th2 are set to the same values, for ease of description. However, the present invention is not limited thereto.

Moreover, ID #1, #2, #3, #4, #5, and #6 are assigned to the six image sensors. Further, the exposure times set to the respective image sensors #1 through #6 are illustrated in table 1.

TABLE 1

| Image sensor ID | Exposure time |
|---|---|
| #1 | 1/125 |
| #2 | 1/500 |
| #3 | 1/2000 |
| #4 | 1/125 |
| #5 | 1/500 |
| #6 | 1/2000 |

Figure 6:
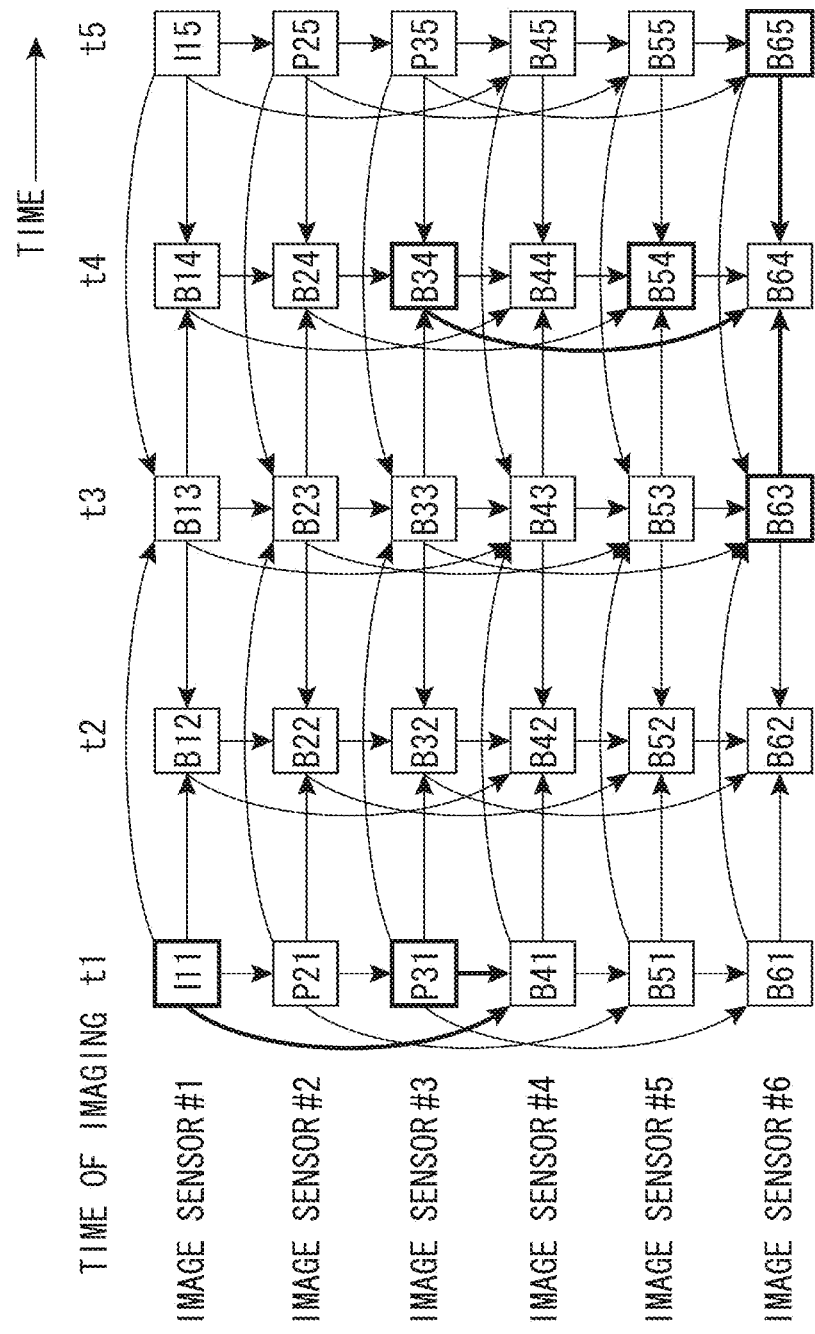
FIG. 6 illustrates a reference relationship between the captured images according to the first exemplary embodiment.

FIG. 6 illustrates the reference relationship between the images when the inter-frame coding unit 402 performs the inter-frame prediction by arranging the images captured using each of the image sensors #1 through #6 by each image capturing time. According to the present exemplary embodiment, the image captured by the image sensor #1 illustrated in FIG. 6 is the base viewpoint image. Further, the coding unit 106 codes the images output from each of the image sensors #1 through #6 in the order of images corresponding to the image sensors #1, #2, #3, #4, #5, and #6. However, the present invention is not limited thereto. For example, the image output from the image sensor #3 may be set as the base viewpoint image, or the images corresponding to each of the image sensors #1 through #6 may be coded in a different order from the above.

The method performed by the reference image selection unit 406 for generating the reference image list will be described below using an image B41 captured by the image sensor #4 at time t1 as illustrated in FIG. 6 as an example. The process will be described with reference to FIGS. 5 and 6 and table 1.

In step S501, the reference image selection unit 406 determines whether the image B41, i.e., the image to be coded, is the base viewpoint image. Since the image B41 is not the base viewpoint image (NO in step S501), the process proceeds to step S502.

In step S502, the reference image selection unit 406 acquires from the image parameter acquiring unit 405, the image parameter of the image sensor #4 which has captured the image B41. As illustrated in table 1, the exposure time of the image sensor #4 is 1/125.

In step S503, the reference image selection unit 406 sets as the list candidate, the image captured by the image sensor whose parallax is smaller than 5 that is the parallax initial value Ph. The list candidate for coding the image B41 is selected from the previously coded images. Further, at time t1, the image captured at time t1 by the image sensor among the image sensors #1 through #6 whose parallax is close to that of the image sensor #4 becomes the list candidate. In other words, the list candidate group for coding the image B41 includes an image I11, an image P21, and an image P31. As a result, the IDs of the image sensors corresponding to the list candidate group become #1, #2, and #3, and the number N of the image sensors corresponding to the images to be listed in the list candidate group becomes 3 (N=3). According to the present exemplary embodiment, in step S504 to step S507, the determination process is performed in an ascending order of the ID of the image sensors (i.e., in the order of #1, #2, and #3), for ease of description.

In step S504, the reference image selection unit 406 acquires the exposure time and the parallax of the first image sensor #1. Referring to table 1 and FIG. 6, the exposure time and the parallax of the image sensor #1 are 1/125 and 3 respectively.

In step S505, the reference image selection unit 406 determines whether the exposure time 1/125 of the image sensor #1 is within the range between the threshold values of the exposure time. The lower limit exposure time Th1 and the upper limit exposure time Th2 of the threshold values of the exposure time are both equal to the exposure time 1/125 of the image sensor #4 that has captured the image to be coded (YES in s505). The exposure time 1/125 of the image sensor #1 is within the range between the threshold values, so that the process proceeds to step S506.

In step S506, the reference image selection unit 406 determines whether the parallax of the image sensor #1 which is 3 is smaller than the minimum parallax Pmin. Since the minimum parallax Pmin is equal to the parallax initial value Ph, the minimum parallax Pmin is 5 (YES in step S507). The process thus proceeds to step S507.

In step S507, the reference image selection unit 406 adds the image I11 to the reference image list, and changes the minimum parallax Pmin, i.e., the threshold value of the parallax, from the parallax initial value Ph, i.e., 5, to the value of the parallax of the image sensor #1, i.e., 3 (rewrites to Pmin=3). The process then proceeds to step S508.

In step S508, the reference image selection unit 406 determines whether the process for selecting the reference image in coding the image to be coded has been performed on the entire list candidate group. Since the number of determinations at this time is 1 (n=1), n<N (N=3) (NO in step S508). As a result, the reference image selection unit 406 determines that the process has not been performed on the entire list candidate group. The process then returns to step S504 via step S509, and the reference image selection unit 406 repeats the determination process on the image P21 captured by the image sensor #2 which is the subsequent list candidate. In step S504, since the exposure time of the image sensor #2 is not within the range between the threshold values, the reference image selection unit 406 does not add the image P21 to the reference image list. The reference image selection unit 406 does not also add the image P31 to the reference image list for the same reason.

In other words, when performing the inter-frame prediction with respect to the image B41 captured by the image sensor #4 at time t1 illustrated in FIG. 6, the image I11 is stored in the reference image list. Further, the vector search unit 407 performs vector search using the image I11.

The present invention is not limited thereto. For example, if a plurality of images is to be stored in the reference image list, the image P31 having the smallest parallax may also be added to the reference image list along with the image I11.

Next, as another exemplary example, the method performed by the reference image selection unit 406 for generating the reference image list for an image B64 captured by the image sensor #6 at time t4 as illustrated in FIG. 6 will be described below with reference to FIGS. 5 and 6 and table 1.

In step S502, the reference image selection unit 406 acquires the exposure time 1/2000 of the image sensor #6 that has captured the image B64.

In step S503, the reference image selection unit 406 selects the image sensor corresponding to the image to be listed in the list candidate group. Four images, i.e., images B24, B34, B44, and B54 satisfying the parallax threshold values, are thus selected as the list candidate group among the images captured at the same time as the image B64 (the number of image sensors is thus N=4).

The reference image selection unit 406 then performs the determination processes from step S504 to step S507 on the image sensors #2, #3, #4, and #5 corresponding to each of the list candidates.

As a result, since the image B34 satisfies the threshold value of the exposure time in step S505, the reference image selection unit 406 stores in the reference image list the image B34 captured by the image sensor #3.

The present invention is not limited thereto. In other words, the image B54 whose parallax is the smallest among the images captured at time t4 when B64 has been captured may be added to the reference image list. Further, the images B63 and B65 captured at a different time by the image sensor #6 which has captured B64, i.e., images captured from the identical viewpoint, may be added to the reference image list.

The second exemplary embodiment will be described below.

Figure 7:
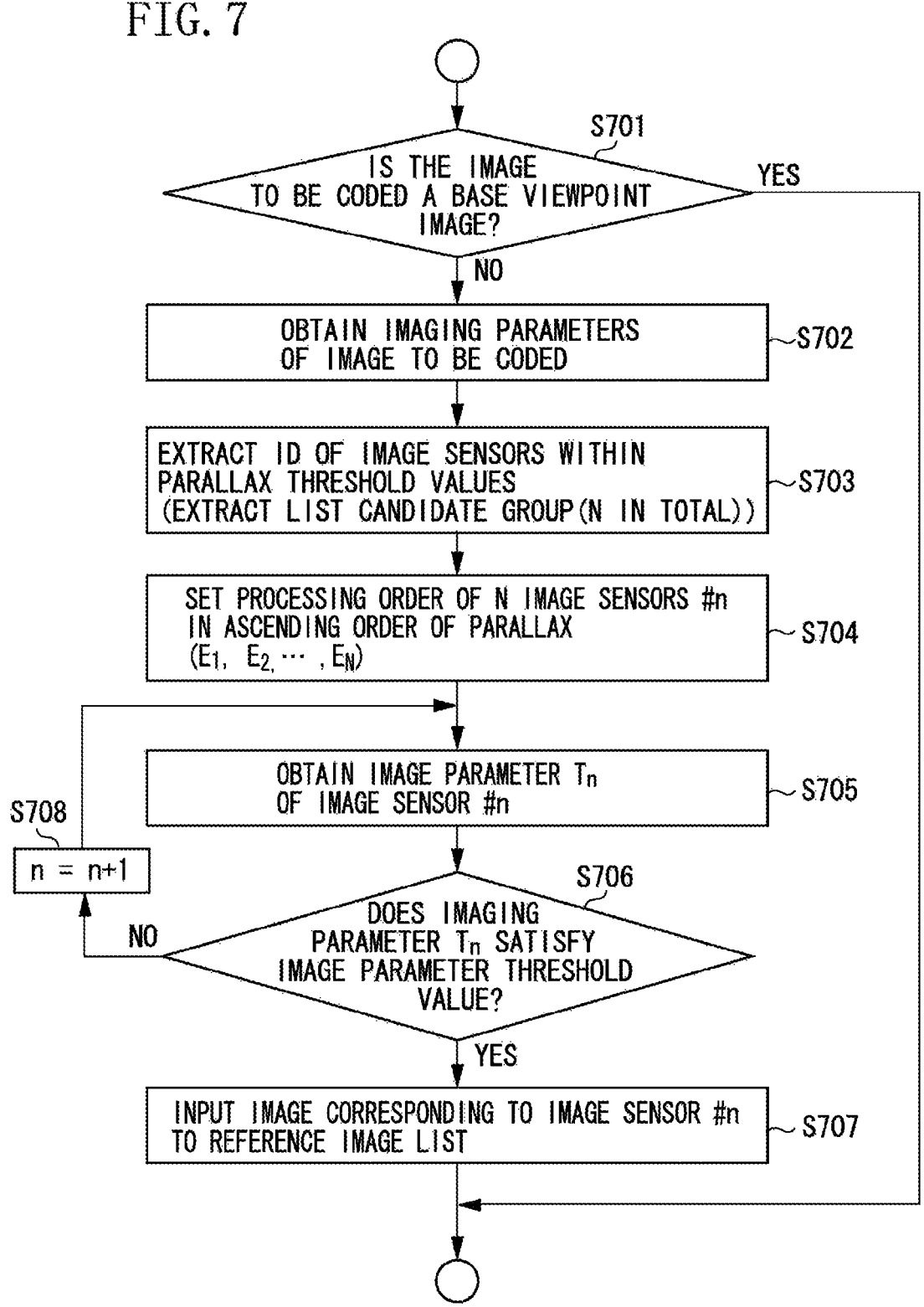
FIG. 7 is a flowchart illustrating a process for selecting the reference image according to a second exemplary embodiment of the present invention.

According to the first exemplary embodiment, the method where the reference image selection unit 406 selects the reference image using the imaging parameters of the image sensor that has captured the image to be coded, is described. According to the present exemplary embodiment, another method performed by the reference image selection unit 406 for selecting the reference image will be described below with reference to the flowchart illustrated in FIG. 7.

According to the present exemplary embodiment, the imaging apparatus is similarly configured as the imaging apparatus according to the first exemplary embodiment illustrated in FIGS. 1, 2, 3, and 4. Description will thus be omitted.

The method for selecting the reference image using the imaging parameters of the image sensor that has captured the image to be coded, is described. Further, step S701 to step S703, step S706, and step S708 illustrated in FIG. 7 respectively correspond to step S501 to step S503, step S505, and step S509 illustrated in FIG. 5. Detailed description will thus be omitted.

Figure 5:
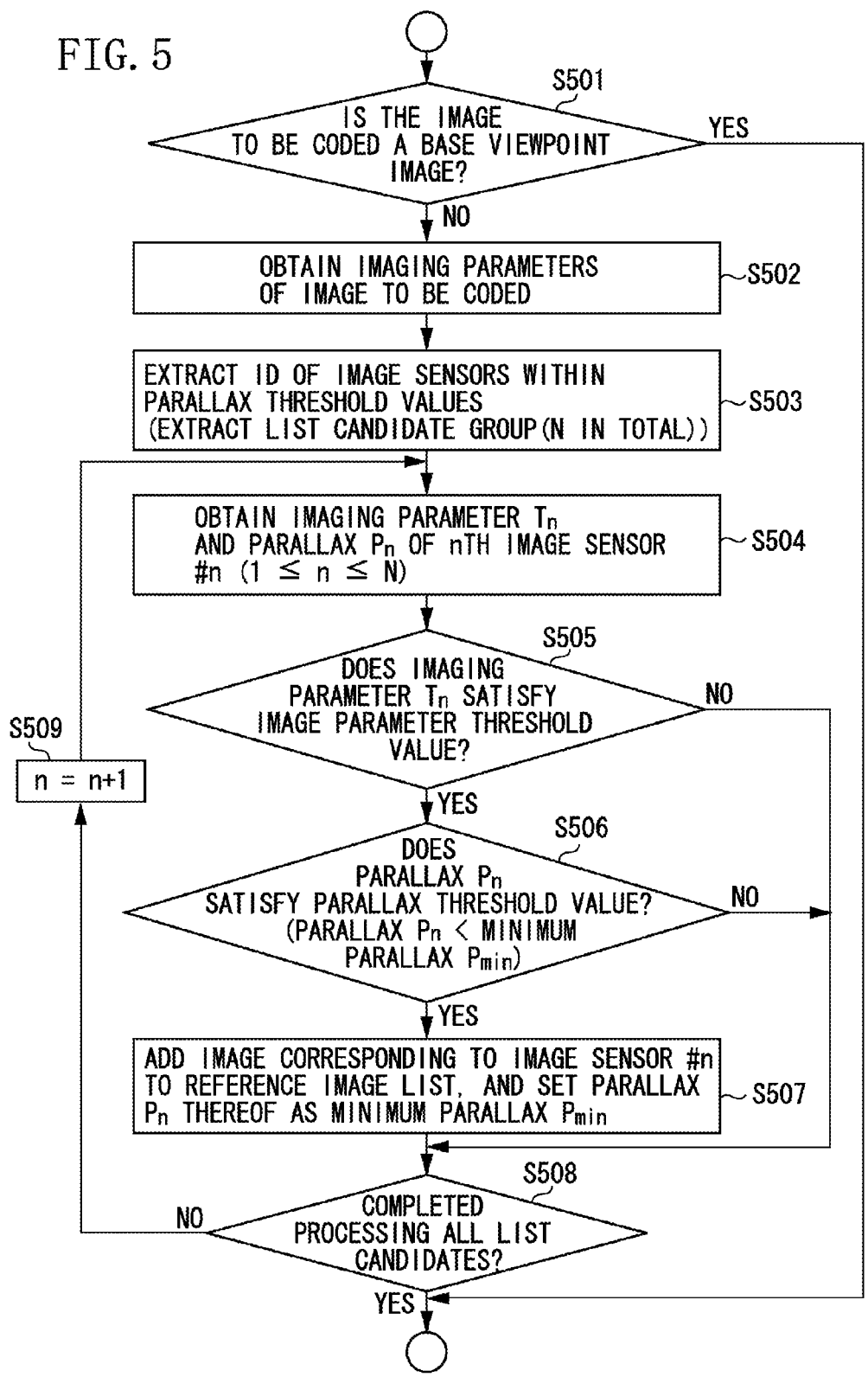
FIG. 5 is a flowchart illustrating a process for selecting the reference image according to the first exemplary embodiment.

In step S701 to step S703, the reference image selection unit 406 performs similar processes as step S501 to step S503 illustrated in FIG. 5.

In step S704, the reference image selection unit 406 acquires the parallaxes of N image sensors (N 1) in total selected in step S703. Further, the reference image selection unit 406 sets the processing order to the N image sensors in the ascending order of the acquired parallaxes.

In step S705, the reference image selection unit 406 acquires the exposure time and the parallax of the nth ($1 \leq n \leq N$) image sensor to be processed, based on the processing order set in step S704. Further, the reference image selection unit 406 sets the exposure time of the nth image sensor as exposure time Tn, and the parallax based on the distance from the image sensor that has captured the image to be coded as parallax Pn.

In step S706, the reference image selection unit 406 determines whether the exposure time Tn acquired in step S705 is within the range between the threshold values. The threshold values of the exposure time are the lower limit exposure time Th1 and the upper exposure time Th2. In step S706, the reference image selection unit 406 thus determines whether the exposure time Tn is within the range between the lower limit exposure time Th1 and the upper exposure time Th2, i.e., the two threshold values of the exposure time. If the exposure time Tn is within the range between the threshold values (YES in step S707), the process proceeds to step S707. On the other hand, if the exposure time Tn is not within the range between the threshold values (NO in step S707), the reference image selection unit 406 does not add to the reference image list the image captured by the nth image sensor. Then the process proceeds to step S708, and in step S708, the reference image selection unit 406 determines whether the image captured by the subsequent image sensor (i.e., the n+1th image sensor) is to be added to the reference image list.

In step S707, the reference image selection unit 406 stores in the reference image list the image captured by the nth image sensor, and ends determination of selecting the reference image.

According to the present exemplary embodiment, the reference image selection unit 406 in step S704 sets the processing order in the ascending order of the parallax, and compares the imaging parameters based on the set processing order. As a result, it is not necessary to determine for the entire list candidate group, whether the imaging parameters satisfy the threshold value. Further, according to the present exemplary embodiment, the reference image selection unit 406 adds to the reference image list the image captured by the image sensor whose image parameters are close to those of the image sensor that has captured the image to be coded, and whose parallax with respect to the above image sensor is small. Such a process is described above with reference to the flowchart illustrated in FIG. 7. However, the present invention is not limited thereto. For example, if prediction coding is to be performed using a plurality of reference images which has been selected, the image having the smallest parallax regardless of the imaging parameters may also be added to the reference image list along with the image selected according to the flowchart illustrated in FIG. 7.

A third exemplary example will be described.

According to the first and second exemplary embodiments, the imaging apparatus performs the present invention. However, the present invention is not limited to being realized by the imaging apparatus, and may be realized by an image processing apparatus including the image processing unit and the coding unit. Further, if the image processing apparatus does not include the image processing unit and the coding unit, the processes performed by the image processing unit and the coding unit may be realized by a computer program.

Figure 8:
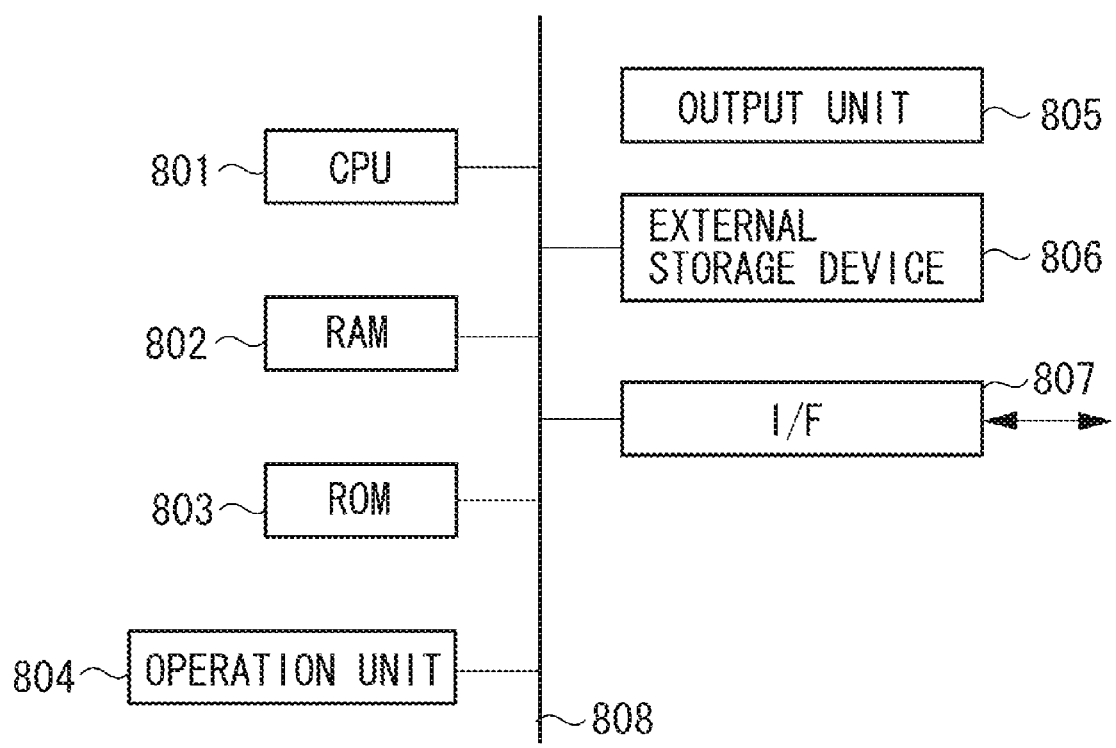
FIG. 8 is a block diagram illustrating a hardware configuration of a computer to which the first and second exemplary embodiments are applicable.

FIG. 8 is a block diagram illustrating an example of the hardware configuration of the computer to which each of the above-described exemplary embodiments is applicable.

Referring to FIG. 8, a CPU 801 controls the entire computer using the computer program or the data stored in a RAM 802 and a ROM 803, and performs each of the above-described processes. In other words, the CPU 801 functions as the image processing unit and the coding unit illustrated in FIG. 1.

The RAM 802 includes an area for temporarily storing the computer programs and data loaded from an external storage device 806, and the data acquired from the outside via an I/F 807. Further, the RAM 802 includes a work area used when the CPU 801 performs the various processes. In other words, the RAM 802 is capable of being allocated as a frame memory, or providing other various areas as appropriate.

The ROM 803 stores setting data and a boot program of the computer. An operation unit 804 configured of a keyboard and a mouse is operated by a user of the computer, so that various instructions are input from the operation unit 804 to the CPU 801.

The external storage device 806 is a high-capacity information storage device such as a hard disk drive. The external storage device 806 stores an operating system (OS) and computer programs for the CPU 801 to realize the functions of each unit. Further, the external storage device 806 may store the image data to be processed.

The CPU 801 performs control as appropriate to load on the RAM 802 and processes the computer programs and data stored in the external storage device 806. An I/F 807 can be connected to the network such as a local area network (LAN) and the Internet, and other devices such as a projection device and a display device. According to the present exemplary embodiment, the computer can acquire and transmit via the I/F 807 various types of information. A bus 808 connects each of the above-described units.

The CPU 801 mainly performs control of the operations realized by such configuration according to processes described with reference to the flowcharts.

Other Embodiments

Aspects of the present invention is also achieved by a storage medium that stores program codes for realizing the functions of the above-described embodiments is supplied to a system, and the system reads out and executes the program codes stored in the storage medium. In such a case, the program codes read out from the storage medium realize the functions of the above-described embodiments, and the storage medium which stores the program codes constitutes the present invention. Also, the present invention includes a case wherein an operating system (OS) or the like running on the computer performs some or all of actual processes on the basis of the instructions of the program codes and these processes realize the functions of the above-described embodiments.

Furthermore, the present invention includes a case in which, after the program codes read out from the storage medium are written in the memory of a function expansion card inserted into the computer or the memory of a function expansion unit connected to the computer, a CPU included in the function expansion card or function expansion unit performs some or all of actual processes on the basis of the instructions of the program codes, and these processes realize the functions of the above-described embodiments.

In the case where the present invention is applied to the above-described storage medium, the storage medium stores the program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-133630 filed Jun. 13, 2012, which is hereby incorporated by reference herein in its entirety.

What is claimed is:

1. A coding apparatus configured to code multi-viewpoint images captured from a plurality of viewpoints with respect to an object, the apparatus comprising:
    an imaging element or device configured to capture images using parameters related to exposure set for each of the plurality of viewpoints; and
    at least one processor that operates to perform inter-frame predictive coding on an image to be coded using a reference image selected from the images captured by the imaging element or device based on the parameters related to the exposure set for each of the plurality of viewpoints,
    wherein the at least one processor further operates to select the reference image based on the parameters related to exposure and a parallax, which is a difference between a viewpoint from which the image to be coded is captured and a viewpoint from which an image other than the image to be coded is captured,
    wherein the at least one processor further operates to first determine whether an image is captured from a viewpoint of which the parallax is within a predetermined range, and
    wherein the at least one processor selects the reference image based on results of the first determination.

2. The coding apparatus according to claim 1, wherein the at least one processor further operates to select as the reference image an image captured using, from among the parameters related to the exposure set for each of the plurality of viewpoints, a parameter which is closer to a parameter related to exposure used in capturing the image to be coded.

3. The coding apparatus according to claim 1, wherein the at least one processor further operates to select the reference image based on the parameters related to exposure and a parameter related to a focus position used in capturing the image to be coded.

4. The coding apparatus according to claim 3, wherein the at least one processor selects as the reference image an image captured from a viewpoint of which the parallax is within the predetermined range.

5. The coding apparatus according to claim 1, wherein the at least one processor further operates to, in a case where the at least one processor determines that the image is captured from a viewpoint of which the parallax is within the predetermined range, second determine whether a parameter related to an exposure used in capturing the image is closer to a parameter related to exposure used in capturing the image to be coded, and
    wherein the at least one processor selects the reference image based on results of the first determination and the second determination.

6. The coding apparatus according to claim 1, wherein the parallax is based on a distance between each of the plurality of viewpoints.

7. The coding apparatus according to claim 4, wherein the at least one processor determines in an ascending order of the parallax, whether a parameter related to an exposure used in capturing the image captured from a viewpoint of which the parallax is within the predetermined range is closer to a parameter related to exposure used in capturing the image to be coded.

8. The coding apparatus according to claim 1, wherein the at least one processor further operates to select the reference image based on at least one of the parameters selected from exposure time, aperture, brightness of a lens, and sensitivity of a sensor, which are related to exposure set for each of the plurality of viewpoints.

9. The coding apparatus according to claim 1, further comprising a plurality of image sensors,
    wherein the coding apparatus codes the multi-viewpoint images captured with respect to the object from the plurality of viewpoints using the plurality of image sensors.

10. A coding method for coding multi-viewpoint images captured from a plurality of viewpoints with respect to an object, the method comprising:
- capturing images using parameters related to exposure set for each of the plurality of viewpoints; and
- performing inter-frame predictive coding on an image to be coded using a reference image selected from the captured images based on the parameters related to the exposure set for each of the plurality of viewpoints,
- wherein the reference image is selected based on the parameters related to exposure and a parallax, which is a difference between a viewpoint from which the image to be coded is captured and a viewpoint from which an image other than the image to be coded is captured,
- wherein it is first determined whether an image is captured from a viewpoint of which the parallax is within a predetermined range, and
- wherein the reference image is selected based on results of the first determination.

11. A non-transitory computer-readable storage medium storing a program for causing a computer to execute a coding method for coding multi-viewpoint images captured from a plurality of viewpoints with respect to an object, the method comprising:
- inputting images that have been captured using parameters related to exposure set for each of the plurality of viewpoints; and
- performing inter-frame predictive coding on an image using a reference image selected from the captured images based on the parameters related to the exposure set for each of the plurality of viewpoints,
- wherein the reference image is selected based on the parameters related to exposure and a parallax, which is a difference between a viewpoint from which the image to be coded is captured and a viewpoint from which an image other than the image to be coded is captured,
- wherein it is first determined whether an image is captured from a viewpoint of which the parallax is within a predetermined range, and
- wherein the reference image is selected based on results of the first determination.

12. The coding apparatus according to claim 1, wherein the at least one processor performs inter-frame predictive coding on the image to be coded using the reference image captured at a viewpoint which is different from a viewpoint at which the image to be coded is captured by the imaging element or device.

13. The coding apparatus according to claim 5, wherein the at least one processor selects a first image as the reference image, and the parameter related to an exposure used in capturing the first image is the closest to the parameter related to exposure used in capturing the image to be coded.

* * * * *